(12) United States Patent
Jupudi et al.

(10) Patent No.: US 11,555,447 B1
(45) Date of Patent: Jan. 17, 2023

(54) SYSTEM AND METHOD FOR INHIBITING PARTICULATE AND FOREIGN OBJECT INGRESS IN COMBUSTION SYSTEMS

(71) Applicant: GENERAL ELECTRIC COMPANY, Schenectady, NY (US)

(72) Inventors: Maruthi Manohar Jupudi, Dubai (AE); Alston Ilford Scipio, Mableton, GA (US); Mallareddy Soudary, Al Khobar (SA); Juergen Gerhard Hoffmann, Untersiggenthal (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/387,493

(22) Filed: Jul. 28, 2021

(51) Int. Cl.
*F02C 7/055* (2006.01)

(52) U.S. Cl.
CPC ........ *F02C 7/055* (2013.01); *F05D 2260/607* (2013.01); *F05D 2270/11* (2013.01); *F05D 2270/3011* (2013.01)

(58) Field of Classification Search
CPC .. F02C 7/05; F02C 7/052; F02C 7/055; F05D 2260/607; F05D 2270/11; F05D 2270/3011
See application file for complete search history.

(56) References Cited

U.S. PATENT DOCUMENTS

| | | | |
|---|---|---|---|
| 6,254,341 B1 | 7/2001 | Ackerman et al. | |
| 7,689,368 B2 | 3/2010 | Douglas | |
| 8,414,676 B2 | 4/2013 | Hiner et al. | |
| 8,475,115 B2 | 7/2013 | Zhang et al. | |
| 9,280,797 B2 | 3/2016 | Ekanayake et al. | |
| 9,556,798 B2 | 1/2017 | Ekanayake et al. | |
| 9,557,246 B2 | 1/2017 | Ekanayake et al. | |
| 9,644,484 B2 | 5/2017 | Ekanayake et al. | |
| 9,718,012 B2 | 8/2017 | Chung et al. | |
| 9,739,168 B2 | 8/2017 | Ekanayake et al. | |
| 9,897,582 B2 | 2/2018 | Jean et al. | |
| 10,220,353 B2 | 3/2019 | Taylor | |
| 10,272,475 B2 | 4/2019 | Scipio et al. | |
| 2014/0123621 A1* | 5/2014 | Driessens | B01D 46/10 29/889.22 |
| 2017/0298286 A1 | 10/2017 | Nowak et al. | |
| 2017/0312673 A1 | 11/2017 | Smith et al. | |
| 2018/0032000 A1 | 2/2018 | Shinkawa et al. | |
| 2018/0068498 A1 | 3/2018 | Hodge | |
| 2019/0160404 A1 | 5/2019 | Smithies | |
| 2019/0226401 A1* | 7/2019 | Heeter | F01D 5/282 |

\* cited by examiner

*Primary Examiner* — Steven M Sutherland
(74) *Attorney, Agent, or Firm* — Grogan, Tuccillo & Vanderleeden, LLP (57) ABSTRACT

A method for inhibiting particulate ingress in a combustion system includes acquiring particulate ingress data, determining a probable particulate ingress location on an air inlet of the combustion system in dependence upon the particulate ingress data, and deploying a filter screen at the determined probable particulate ingress location to inhibit particulate ingress at the determined probable particulate ingress location.

20 Claims, 8 Drawing Sheets

SYSTEM AND METHOD FOR INHIBITING PARTICULATE AND FOREIGN OBJECT INGRESS IN COMBUSTION SYSTEMS

BACKGROUND

Technical Field

Embodiments of the invention relate to combustion systems for power generation and, more particularly, to a system and method for inhibiting particulate and foreign object ingress in gas turbine combustion systems.

Discussion of Art

Gas turbines are used throughout the world in many diverse applications and environments. This diversity creates a number of challenges to air filtration systems, necessitating various solutions depending on the environmental contaminant(s)/particulates, gas turbine platform technology, and/or fuel quality. For example, gas turbines which operate in deserts or high dust concentration areas, along coastlines, in other environments in which the turbine is exposed to severe air quality contaminations, and/or high efficiency gas turbines operating at high operational temperatures, face significant challenges with respect to engine performance, reliability, and/or maintainability where there is a compromise or breach in the air inlet of the gas turbine system. Such challenges may include the erosion, corrosion and/or failure of various turbine components.

To prevent debris and/or particles from entering the gas turbine, the filtration systems typically include multiple stages of filtration components that filter various sizes of debris and/or particles prior to the working fluid (e.g., filtered air) entering the compressor of the gas turbine. However, these components included in conventional filtration systems can become damaged by the same debris and may no longer filter out the debris and particles as desired. Additionally, or alternatively, the components included in conventional filtration systems may not operate as desired. Existing solutions have focused on adding filtration stages or components, which provides additional obstructions to the inlet airflow to the gas turbine. In particular, existing filtration systems may decrease the airflow across such systems by the addition of filter stages, which negatively impacts the efficiency and performance of the gas turbine system, as a whole.

In view of the above, there is a need for a system and method for inhibiting or preventing particulate and foreign object ingress in a gas turbine system that minimizes the effect on overall system efficiency and performance.

BRIEF DESCRIPTION

In an embodiment, a method for inhibiting particulate ingress in a combustion system includes acquiring particulate ingress data, determining a probable particulate ingress location on an air inlet of the combustion system in dependence upon the particulate ingress data, and deploying a filter screen at the determined probable particulate ingress location to inhibit particulate ingress at the determined probable particulate ingress location.

In another embodiment, a turbine system includes a turbine having a compressor for compressing intake air, and an inlet filter housing in fluid communication with the compressor and having an array of air passages for ingress of the intake air, the inlet filter housing being configured to remove particulates from the intake air prior to passage of the intake air to the compressor. The inlet filter housing includes an array of air passages for receiving the intake air therethrough, and an array of filter screens generally corresponding to the array of air passages. The array of filter screens are individually movable between a retracted position where the intake air is permitted to bypass a respective filter screen, and a deployed position where the intake air passes through the filter screen. When in the deployed position, the filter screens are configured to remove the particulates from the intake air.

In yet another embodiment of the invention, a method for inhibiting particulate ingress in a combustion system includes the steps of providing an inlet duct in fluid communication with a turbine having a compressor, the inlet duct having an intake area for a flow of intake air, determining at least one location of particulate or foreign object ingress along the intake area, and moving a first subset of filter screens of an array of filter screens so as to extend across the flow of intake air at the location of particulate or foreign object ingress.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are directed to a system and method for inhibiting particulate and foreign object ingress in gas turbine systems, embodiments of the invention are not so limited in this regard and are also applicable to a variety of systems including, for example, aero/marine, hydrogen/ammonia, etc. based turbine applications and, still further is also applicable to the removal of particulate, moisture and/or foreign objects in a flow of air to be utilized for any purpose (compression, cooling, heating, etc.).

As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions.

The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Embodiments of the invention relate to systems and methods for inhibiting or preventing the ingress of particulates or foreign object debris in a combustion system, such as a gas turbine combustion system. In an embodiment, a method for inhibiting particulate ingress in a combustion system includes acquiring particulate ingress data, determining a probable particulate ingress location on an air inlet of the combustion system in dependence upon the particulate ingress data, and deploying a filter screen at the determined probable particulate ingress location to inhibit particulate ingress at the determined probable particulate ingress location.

Figure 1:
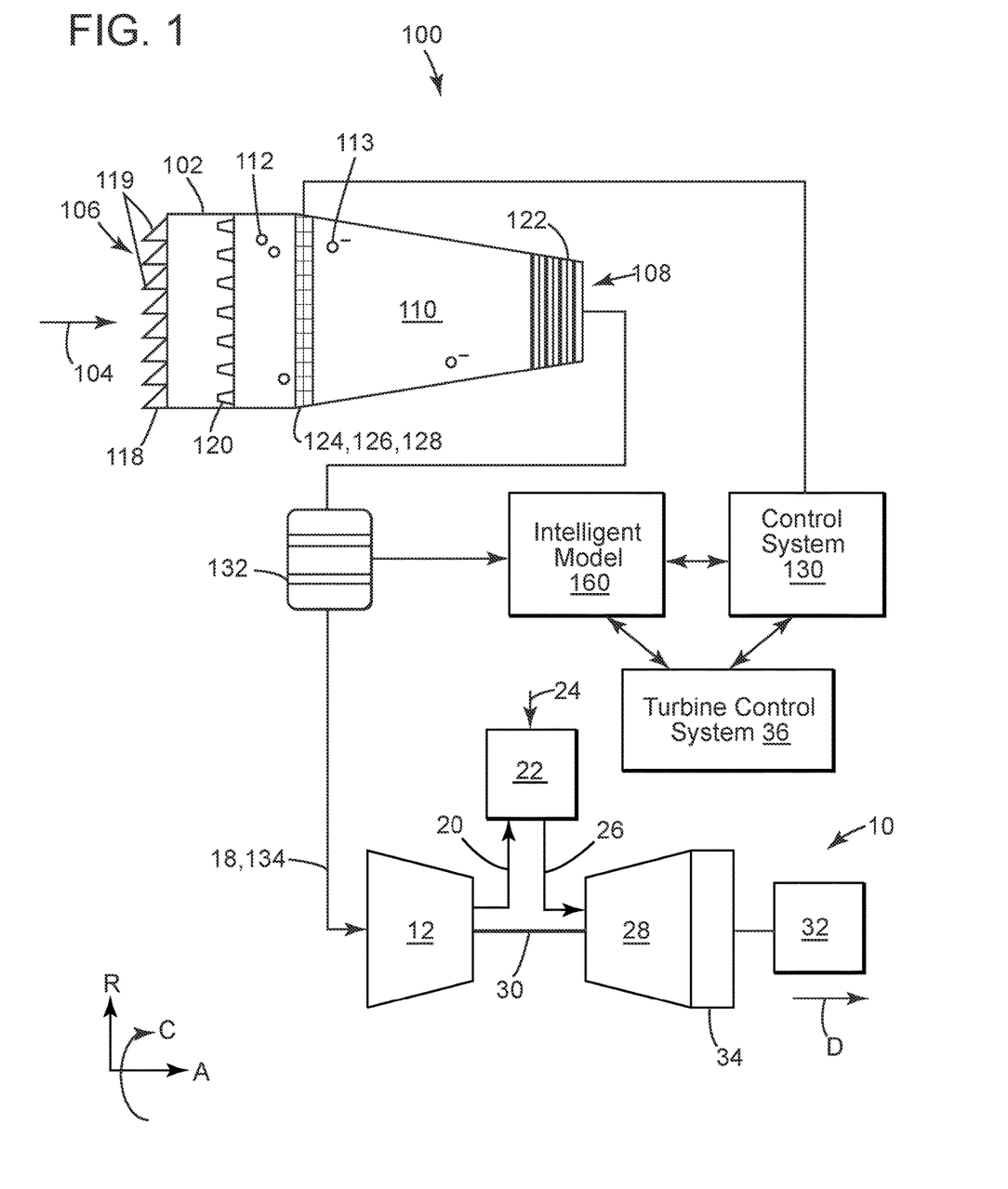
FIG. 1 is a schematic illustration of a gas turbine and air filtration assembly/system according to an embodiment of the invention.
Figure 2:
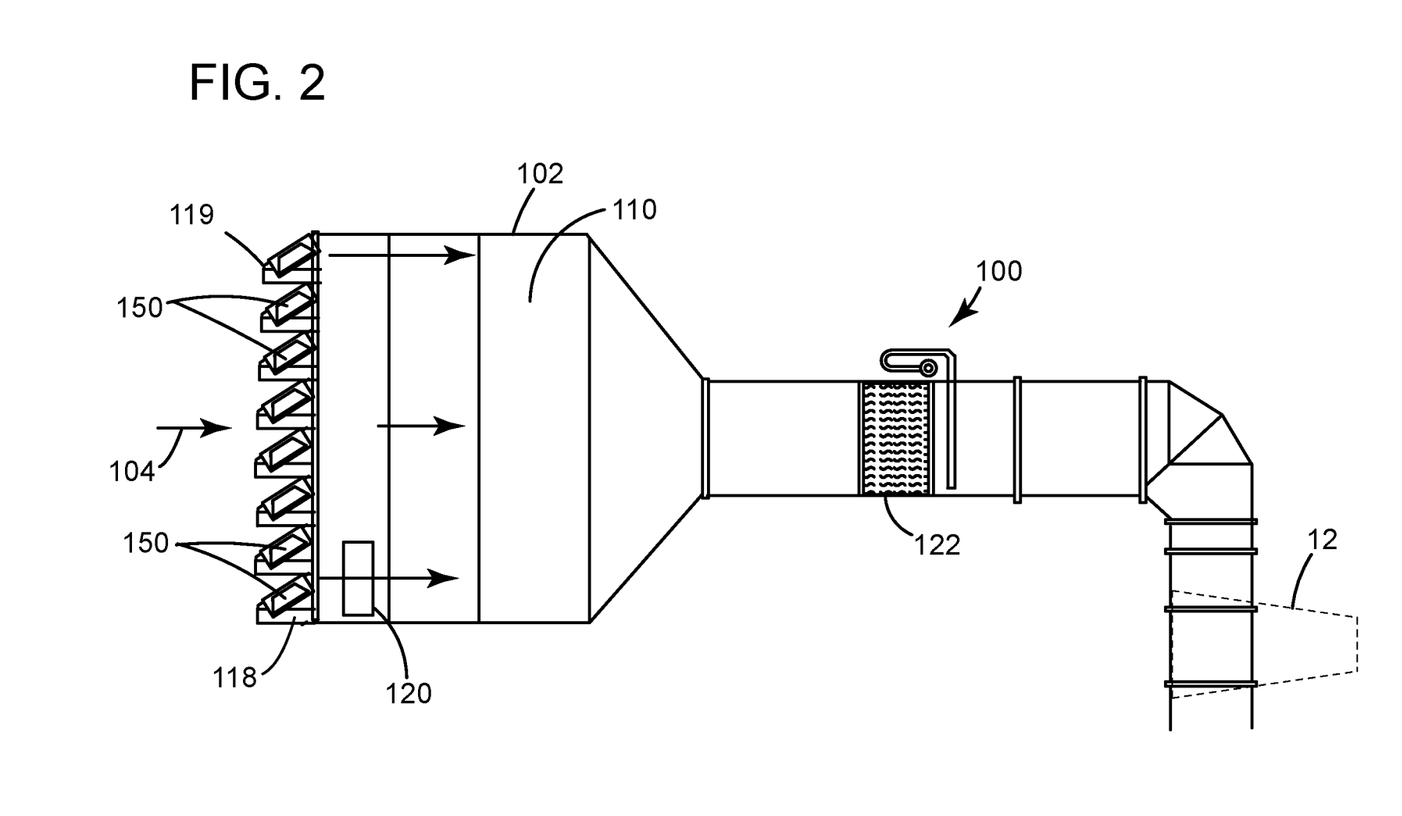
FIG. 2 is an enlarged, simplified schematic illustration of a portion of the air filtration system of FIG. 1, showing filter screens in a retracted position.

FIG. 1 is a schematic illustration of a turbine system (e.g., gas turbine system 10) according to an embodiment of the invention. Gas turbine system 10 includes a compressor 12 and an air filtration assembly 100 positioned upstream of and in fluid communication with compressor 12. Compressor 12 is configured to compresses an incoming flow of filtered air 18 that is filtered by and flows from air filtration assembly 100 to compressor 12, as discussed herein. Compressor 12 typically includes a plurality of rotatable blades including airfoils (not shown) and stationary nozzles (not shown) which work together to compress the filtered air 18 as it flows through compressor 12. Compressor 12 delivers a flow of compressed air 20 to a combustor 22. Combustor 22 mixes the flow of compressed air 20 with a pressurized flow of fuel 24 and combusts the mixture to create a flow of combustion gases 26. Although only a single combustor 22 is shown, gas turbine system 10 may include any number of combustors 22. The flow of combustion gases 26 is, in turn, delivered to a turbine 28. Similar to compressor 12, turbine 28 also typically includes a plurality of turbine blades including airfoils and stator vanes. The flow of combustion gases 26 drives turbine 28, and more specifically the plurality of turbine blades of turbine 28, to produce mechanical work. The mechanical work produced in turbine 28 drives compressor 12 via a rotor 30 extending through turbine 28 and may be used to drive an external load 32, such as an electrical generator and/or the like.

As also shown in FIG. 1, gas turbine system 10 may also include an exhaust frame or exhaust diffuser 34. The exhaust frame 34 is positioned adjacent to turbine 28 of the gas turbine system 10. More specifically, exhaust frame 34 may be positioned adjacent to turbine 28 and may be positioned substantially downstream of turbine 28 and/or the flow of combustion gases 26 flowing from combustor 22 to turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 26 may flow through exhaust frame 34 in the flow direction (D) and may be discharged from gas turbine system 10 (e.g., to the atmosphere). In another non-limiting example (not shown) where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

As further shown in FIG. 1, and discussed in detail hereinafter, air filtration assembly/system 100 of gas turbine system 10 may include a plurality of sensors, components, devices, and/or systems configured to detect the presence of particulates and/or foreign objects present in intake air, and to filter such particulates and/or foreign objects to produce filtered air 18 that is then delivered to the compressor 12. In an embodiment, particulates and/or foreign objects may include dust, sand, water and/or other debris. As discussed herein, the detection of particles and/or improved filtration of particles using air filtration assembly 100 may reduce, inhibit or prevent damage to the internal components of gas turbine system 10 which receive and/or utilize filtered air 18 during operation. Furthermore, the implementation of air filtration assembly 100 may maintain/improve operational efficiencies of gas turbine system 10 by reducing/eliminating the number of undesirable particles included in filtered air 18.

As shown in FIG. 1, air filtration assembly 100 of gas turbine system 10 may include an air inlet duct 102 (also referred to herein as inlet filter housing 102), which may be in fluid communication with compressor 12 of gas turbine system 10 for providing filtered air 18 thereto. Inlet filter housing 102 may be formed from any suitable duct components and/or duct system that may be configured to receive an intake air 104 and include or house at least one component, device, and/or system therein to filter intake air 104 from the atmosphere surrounding the inlet filter housing 102. The inlet filter housing 102 may include an inlet 106 positioned and/or formed on a first end of the inlet filter housing 102, an outlet 108 positioned opposite inlet 106 on a second end of the inlet filter housing 102, and an internal cavity 110 extending between inlet 106 and outlet 108.

Inlet 106 may receive intake air 104 including particle(s) 112 and may subsequently pass intake air 104 through internal cavity or space 110 of the inlet filter housing 102/inlet ducting to outlet 108 to be provided to compressor 12. As discussed herein, intake air 104 including particles 112 may move through internal cavity 110 of air inlet filter housing 102 and interact and/or be processed by the component(s), device(s), and/or system(s) of air filtration assembly 100 within the inlet filter housing 102 to filter particles 112 from intake air 104. Filtering particles 112 from intake air 104 may form filtered air 18 utilized as working fluid by compressor 12, as indicated above.

In an embodiment, the air filtration assembly 100 may include a plurality of vane filters 118 that may filter large particles 112 from intake air 104. In an embodiment, the vane filters 118 may be vane separators or coalescers that function to accumulate water droplets and shed them away through drains or through coalescing. More specifically, air filtration assembly 100 may include a plurality of vane filters 118 positioned on, at, within, and/or adjacent inlet of inlet 106 of air inlet filter housing 102. The plurality of vane filters 118 positioned at inlet 106 may provide the first form of filtration of intake air 104 for removing particles 112 included in intake air 104. The plurality of vane filters 118 may be formed as any suitable filtering component that may be configured to remove and/or filter out large particles and/or debris that may be found in intake air 104, such as, sand grains, dirt, rain drops, snow, and other undesirable debris. In non-limiting examples, the plurality of vane filters 118 may be positioned within respective weather hoods 119 located on the face of the inlet filter housing 102, as discussed below. In an embodiment, the vane filters 118 may be omitted.

As further shown in FIG. 1, an array of fabric filters 120 may also be included in air filtration assembly 100. In the non-limiting example shown in FIG. 1, the array of fabric filters 120 may be positioned in inlet filter housing 102 and, more specifically, in internal cavity 110 of inlet filter housing 102. Additionally, the array of fabric filters 120 may be positioned in the inlet filter housing 102 downstream of inlet 106 and the plurality of vane filters 118. The array of fabric filters 120 may be formed as any suitable filtering components and/or devices that may be configured to further filter particles 112 from intake air 104 flowing therethrough. That is, the array of fabric filters 120 may be configured to filter finer and/or smaller particulates included in intake air 104 that may not necessarily be filtered by the plurality of vane filters 118. In the non-limiting example shown, the array of fabric filters 120 may be formed as a plurality of fabric filter bags. In another non-limiting example, fabric filters 120 may be formed from a plurality of conical fabric filters. The array of fabric filters 120 may also be formed as either pulsed fabric filters or static fabric filters.

Figure 3:
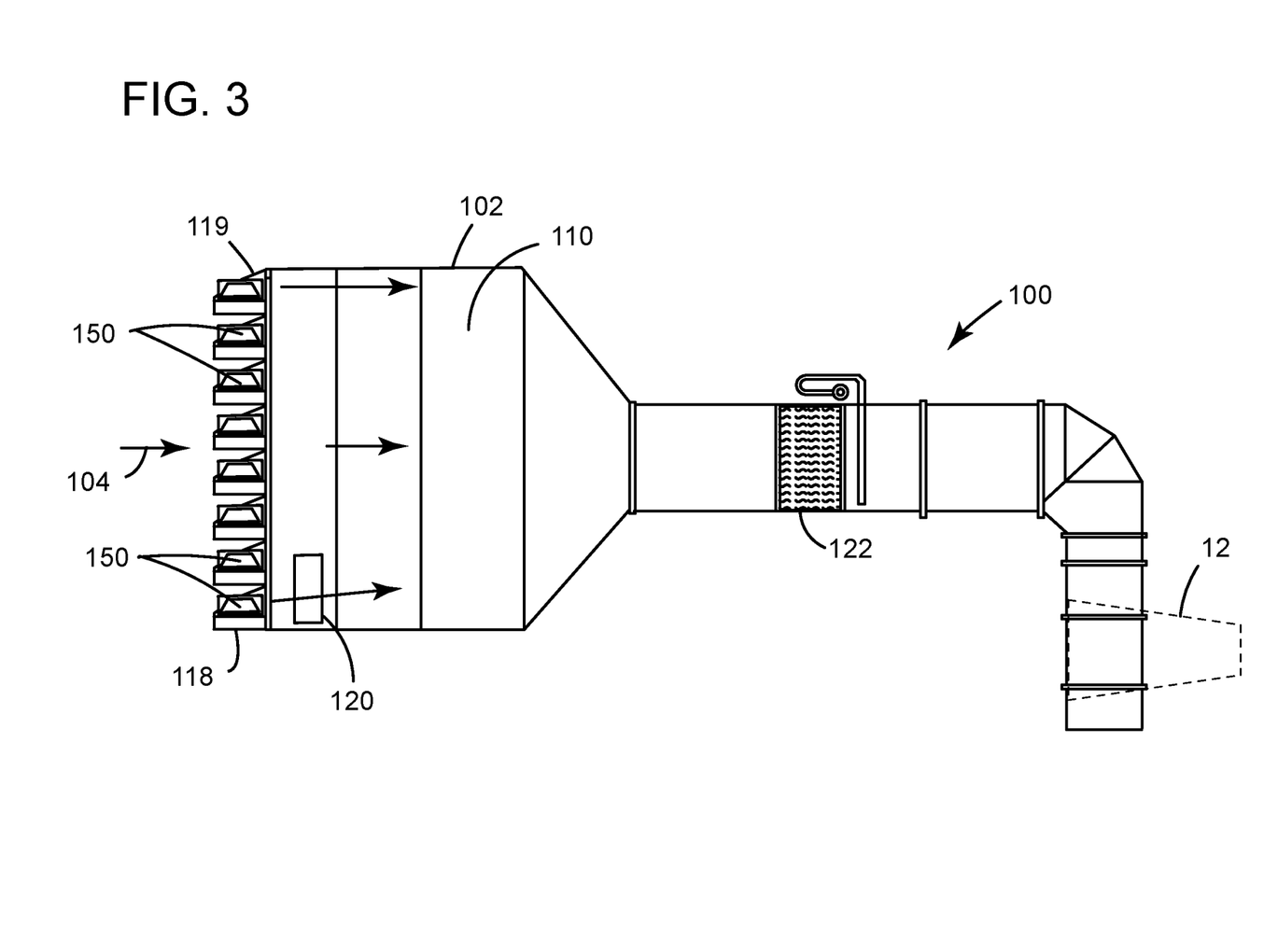
FIG. 3 is an enlarged, simplified schematic illustration of a portion of the air filtration system of FIG. 1, showing filter screens in a retracted position.

Turning briefly to FIGS. 2-5, in an embodiment, the air filtration assembly 100 may additionally include a plurality of filter screens 150 arranged at the face of the inlet filter housing 102 (in addition, or alternative to, the vane filters 118), which are each selectively movable between a retracted position where the intake air 104 bypasses, or flows around (but not through) the filter screen 150 (see FIG. 2), and a deployed position where the filter screen 150 extends across a respective inlet passage such that the intake air 104 flows through the filter screen 150 (see FIG. 3). In an embodiment, each weather hood 119 at the inlet 106 may form an inlet passage for the flow of intake air 104, and each weather hood 119 may include an associated filter screen 150, as discussed below. In particular, in an embodiment, the inlet 106 includes an array of weather hoods 119 forming a generally rectangular array or matrix of air inlet passages, each of which includes a respective filter screen 150, the positions of which are independently controllable.

Figure 4:
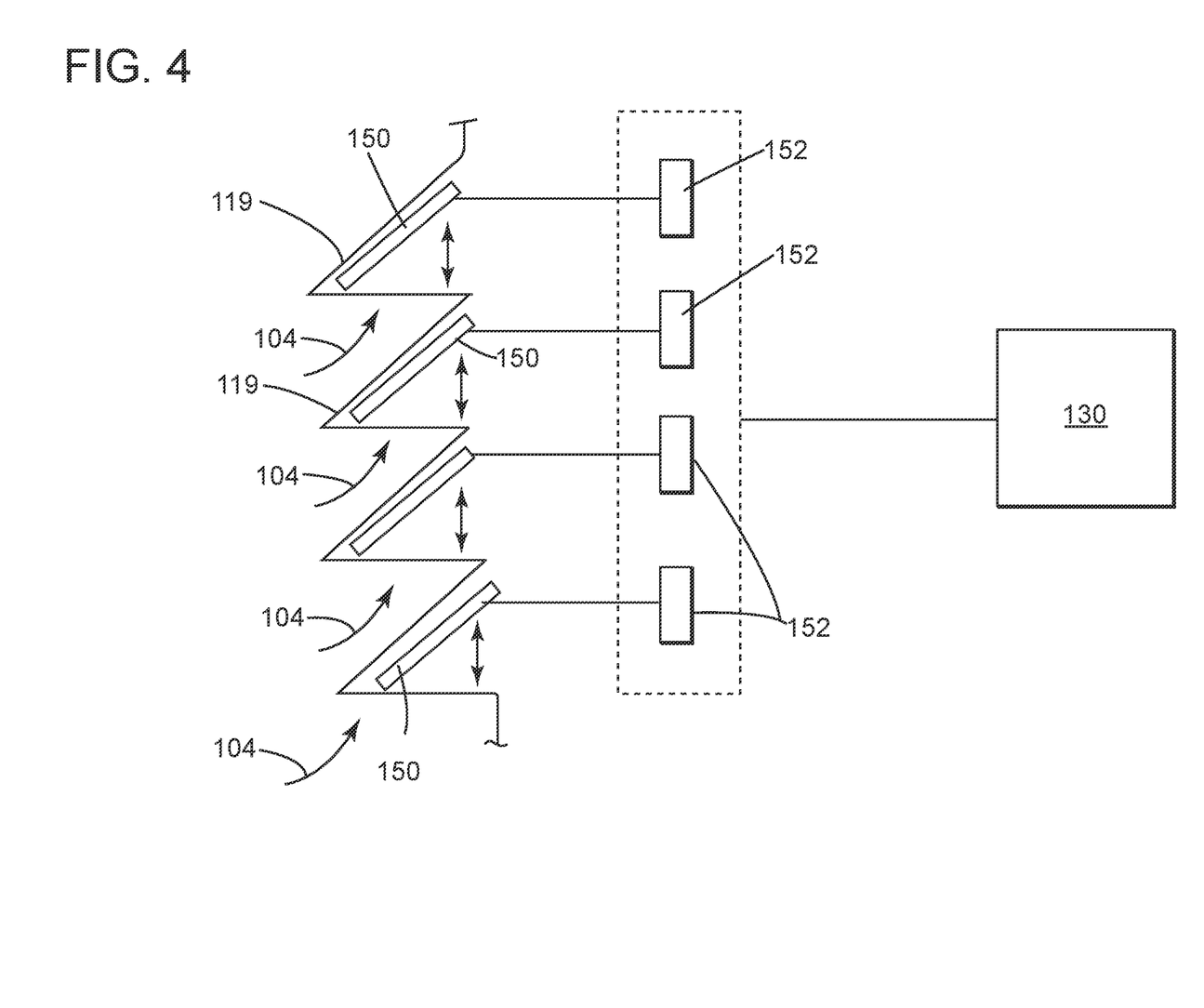
FIG. 4 is a simplified schematic illustration of an inlet filter housing of the air filtration system of FIG. 1, showing filter screens according to one embodiment of the invention.

With reference to FIG. 4, in an embodiment, the each filter screen 150 is connected to, otherwise associated with, an electrical relay or switch 152 that is in communication or otherwise electrically coupled with a control system 130 for controlling the position of each filter screen 150 (i.e., retracted or deployed). For example, in an embodiment, the relays 150 may be associated with a respective actuator (e.g. a mechanical, hydraulic, pneumatic actuator or the like) for moving each filter screen 150 between the retracted and deployed positions under control of the control system 130.

Figure 5:
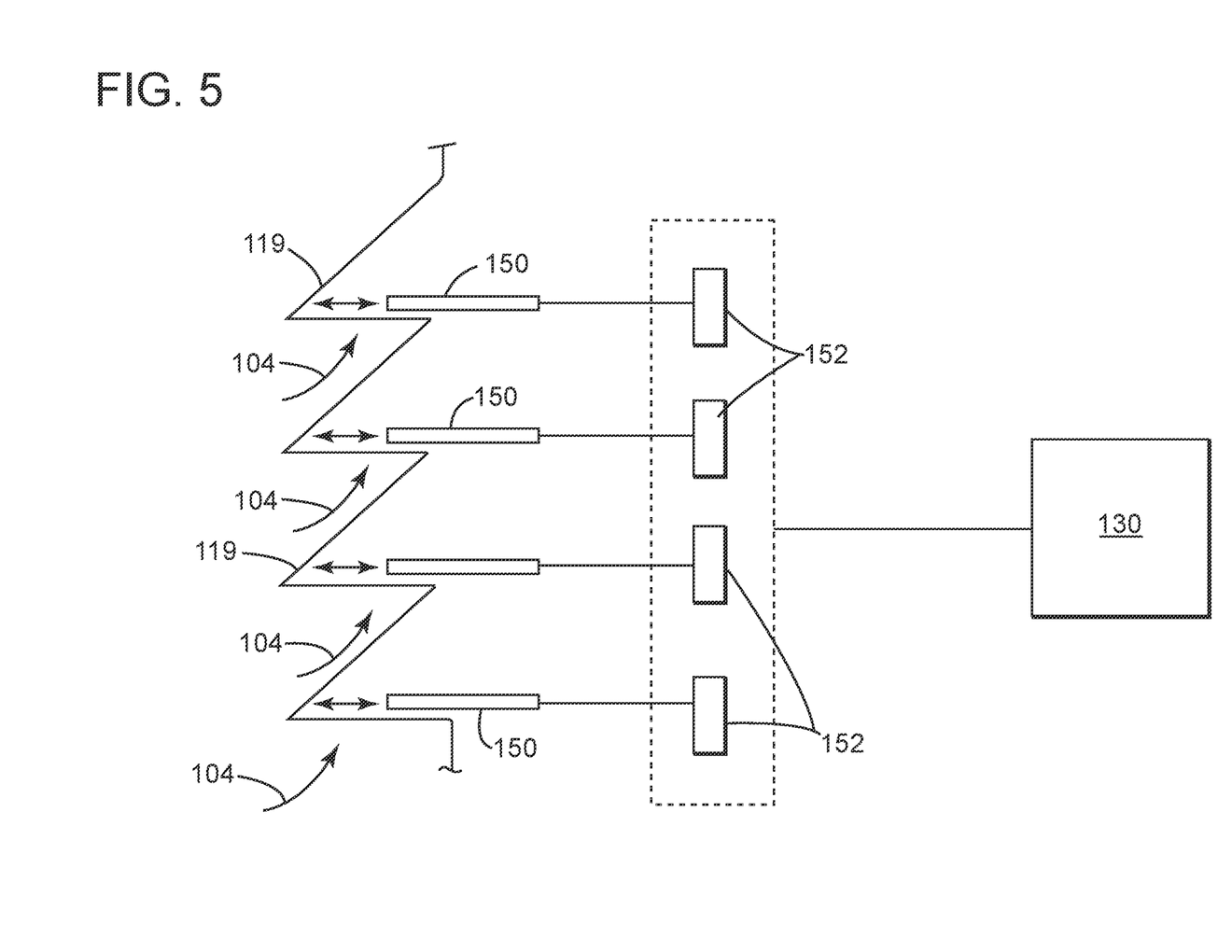
FIG. 5 is a simplified schematic illustration of an inlet filter housing of the air filtration system of FIG. 1, showing filter screens according to another embodiment of the invention.

As shown in FIG. 4, in one implementation, the filter screens 150 may be pivotally connected to the inlet filter housing 102 (or the weather hoods 119 thereof) such that they may rotate into and out of the deployed and retracted positions under control of the control system 130 (via relays 152), as indicated by the arrows. With reference to FIG. 5, in another embodiment, the filter screens 150 may be slidably connected to the inlet filter housing 102 (or the weather hoods 119 thereof) such that they are slidably moveable between the retracted and deployed positions, as indicated by the arrows. In an embodiment, the filter screens 150 may be mounted on rollers, slides or tracks for facilitating the deployment and retraction of the filter screens 150.

In an embodiment, the filter screens 150 are thin mesh screens having an anti-rebounding coating, and are shaped and dimensioned so as to fully extend across each inlet passage of a respective weather hood 119 when in the extended/deployed position so as to ensure that all of the inlet air 104 entering such passage passes through the filter screen 150. As used herein, "anti-rebounding" means configured and formulated so as to deflect or direct entrained particulates and foreign object debris out of or away from the primary flow of intake air. In an embodiment, the coating is an anti-rebounding coating, and/or a coating with hydrophilic or hydrophobic or coalescing properties/characteristics and/or corrosion resistance properties. In an embodiment, the specific formulation and characteristics of the coating may be selected in dependence upon the type of particulate that is to be kept out of the flow of intake air (e.g., sand, dust or moisture). In some embodiments, the coating may be selected to have a high bouncing effect on particulates. In other embodiments, the coating may be selected to have a low bouncing effect on particulates. That is, the composition of the coating can be altered or chosen to achieve the relevant property of either low bouncing or high bouncing effect based on the application of the coating (e.g., in arid or high moisture environments). In an embodiment the coating may be Ti-6-4 or Polyurethane.

Referring back to FIG. 1, air filtration assembly 100 may also include a silencer assembly 122. Silencer assembly 122 may be positioned in air inlet filter housing 102 and/or in internal cavity 110 of air inlet filter housing 102. As shown in FIG. 1, silencer assembly 122 may be positioned downstream of the array of fabric filters 120, and adjacent outlet 108 of inlet filter housing 102. In the non-limiting example, intake air 104 may pass through silencer assembly 122 to form filtered air 18, which may in turn be provided from silencer assembly 122 and/or outlet 108 of air filtration assembly 100 to compressor 12, as discussed herein. Silencer assembly 122 may be formed as any suitable component, system, and/or assembly of components configured to reduce the "noise" of compressor 12 transmitted through the air inlet 106. For example, silencer assembly 122 may be formed as a plurality of silencer panels that may muffle and/or reduce the noise associated with the operation of gas turbine system 10.

The non-limiting example of air filtration assembly 100 shown in FIG. 1 also includes components, devices, and/or systems that may detect undesirable particles 112 in intake air 104. More specifically, during operation of air filtration assembly 100 undesirable particles 112 included in intake air 104 may not be filtered by the plurality of vane filters 118, the filter screens 150, and/or the array of fabric filters 120. Particles 112 may not be filtered due to their size (e.g., neither filtered by vane filters 118 nor fabric filters 120), and/or due to faults or deficiencies in the plurality of vane filters 118 and/or the array of fabric filters 120. For example, and as shown in FIG. 1, particles 112 may pass through, not be filtered by, and/or may flow downstream of the array of fabric filters 120 due to particle size, filter tears, and/or holes formed in some of the fabric filters 120 or in other components of the assembly 100, improper installation of fabric filters 120, and/or per solving and recrystallization processes. The tears and/or holes may be formed in fabric filters 120 by debris (e.g., insects) that may flow past the plurality of vane filters 118, improper installation and/or care of fabric filters 120, manufacturing defects, and/or operational wear of fabric filters 120. As a result, particles 112 included in intake air 104 may not be filtered and/or collected by fabric filters 120 and may flow through the holes. As discussed herein, detecting particles 112 within the air inlet duct(s) beyond the plurality of vane filters 118, filter screens 150, and/or the array of fabric filters 120 may indicate that components of air filtration assembly 100 are not functioning properly and/or may require maintenance (e.g., replacement of torn fabric filters). This in turn, may reduce/prevent damage to compressor 12, combustor 22, and/or turbine 28 by particles 112 during operation, and/or may maintain/improve operational efficiencies of gas turbine system 10 by reducing/eliminating the number of undesirable particles 112 included in filtered air 18.

As shown in FIG. 1, air filtration assembly 100 may include an electrostatic component 124 positioned in inlet filter housing 102. More specifically, electrostatic component 124 may be positioned within internal cavity 110 of inlet filter housing 102, downstream of the array of fabric filters 120. Additionally as shown, electrostatic component 124 may be positioned upstream of silencer assembly 122 of air filtration assembly 100. Electrostatic component 124 may be configured to charge particles 112 that pass through the plurality of vane filters 118 and/or the array of fabric filters 120, and in turn through and/or over electrostatic component 124. As discussed herein, charged particles 113 included in intake air 104 may allow for easier and/or improved detection of particles 113 before particles 113 reach compressor 12 of gas turbine system 10.

In the non-limiting example shown in FIG. 1, electrostatic component 124 may be formed and/or configured as a plurality or matrix of ionizers 126 (hereafter, "matrix of ionizers 126"). The matrix of ionizers 126 may be positioned within inlet filter housing 102, downstream of the array of fabric filters 120. The matrix of ionizers 126 may span over the entirety of a front cross-sectional area of inlet duct 102. That is the matrix of ionizers 126 forming electrostatic component 124 may span and/or cover the entirety of an area of internal cavity 110 of inlet duct 102, such that every particle 112 that may pass the array of fabric filters 120 must pass over and/or pass through the matrix of ionizers 126. In the non-limiting example, the matrix of ionizers 126 forming electrostatic component 124 may be formed as a plurality of matrix of corona chargers or corona wires. However, it is understood that ionizers 126 of filtration assembly 100 may be formed from any suitable device, component, and/or system that may be configured to charge intake air particles 112, as discussed herein.

In a non-limiting example, control system 130 and turbine control system 36, may be formed or configured as single, stand-alone systems or computing devices that function separately, as discussed herein, and are in communication with one another. Alternatively, control system 130 may be integrally formed within, in communication with and/or formed as a part of turbine control system 36. However embodied, control system 130 and turbine control system 36 may be formed of any suitable device and/or system that may be configured to obtain and process information relating to gas turbine system 10, and control the various components of gas turbine system 10 and air filtration assembly 100.

Air filtration system 100 may also include at least one electrostatic sensor 132. As shown in FIG. 1, electrostatic sensor(s) 132 may be operably coupled to and/or in operable communication with control system 130. Electrostatic sensor(s) 132 may be positioned downstream of the matrix of ionizers 126. Additionally, electrostatic sensor(s) 132 may be positioned upstream of compressor 12. In the non-limiting example, electrostatic sensor(s) 132 may also be positioned downstream of inlet filter housing 102 and silencer assembly 122, respectively. In other non-limiting examples (not shown) electrostatic sensor(s) 132 may be positioned upstream of silencer assembly 122 and within air inlet duct 102, respectively, or alternatively electrostatic sensor(s) 132 may be positioned within silencer assembly 122 as long as electrostatic sensor(s) 132 are positioned downstream of the matrix of ionizers 126, but upstream of compressor 12. In the non-limiting example, electrostatic sensor(s) 132 may be in fluid communication and/or positioned within a conduit 134 fluidly coupling air filtration assembly 100 and compressor 12. That is, electrostatic sensor(s) 132 may be in communication with conduit 134 that may deliver filtered air 18 to compressor 12.

Electrostatic sensor(s) 132 may be formed from any suitable sensor and/or device that may be configured to detect the charged particles 112 of intake air 104 that may be previously charged by the matrix of ionizers 126 and flow past electrostatic sensor(s) 132 (e.g., particulate matter sensor). As discussed herein, electrostatic sensor(s) 132 detect the total load carried by the uncharged 112 and charged particles 113. In non-limiting examples, electrostatic sensor(s) 132 may be formed as button sensors with high local resolution, multiple button system sensors arranged in a ring, circumferential ring sensors, and the like. Additionally, or alternatively, electrostatic sensor(s) 132 may be staged in flow direction to increase the detectability of charged particles 113 dragged by the flow and charged by the matrix of ionizers 126 by correlating the signals of the different stages together with the flow speed known from the turbine control system 36.

It is understood that the location(s) and number of electrostatic sensor(s) 132 shown in the embodiments is merely illustrative. That is, in the non-limiting example shown in FIG. 1, two electrostatic sensors 132 are shown. Air filtration assembly 100 may include more or less electrostatic sensor(s) 132 than those shown in the figures.

During operation of gas turbine system 10, intake air 104 may flow through air filtration assembly 100 to provide working fluid (e.g., filtered air 18) to compressor 12. Particles 112 included in intake air 104 may undesirably flow through filtering components (e.g., plurality of vane filters 118, the array of fabric filters 120) due to damage and/or defect in the same components. In air filtration assembly 100, particles 112 that are not filtered by the plurality of vane filters 118, and/or the array of fabric filters 120 may pass through the matrix of ionizers 126 forming electrostatic component 124. The matrix of ionizers 126 in turn may charge particles 112. More specifically, each of the plurality of ionizer cells 128 forming the matrix of ionizers 126 may electrically charge each particle 112 that flows therethrough, based on a distinct, predetermined voltage of each of the plurality of ionizer cells 128, as controlled by control system 130. Furthermore, when particle(s) 112 pass over and/or pass through one of the plurality of ionizer cells 128, particles 112 may alter the breakthrough or breakdown voltage within the corresponding ionizer cell 128, which may also be detectable by control system 130.

As charged particles 113 flow out of air filtration assembly 100 and are delivered to compressor 12 via conduit 134, charged particles 113 may be detected by electrostatic sensor(s) 132. Electrostatic sensor(s) 132 may detect charge particles 113 and may provide information to control system 130 relating to charged particles 112, including, but not limiting to, the amount/concentration of charged particles 113, and/or the associated or corresponding carried load for each detected, charged particle 113. Using this information generated by electrostatic sensor(s) 132, control system 130 may determine if the amount and/or the type of uncharged particles 112 and charged particles 113 included in filtered air 18 being provided to compressor 12 may damage compressor 12 and/or reduce the operational efficiency of gas turbine system 10. In the non-limiting example where, for instance, the concentration and/or amount of charged particles 113 could or will damage compressor 12, combustor 22, and/or turbine 28, control system 130 may suggest or signal to turbine control system 36 that gas turbine system 10 should be shut down to prevent damage. The inclusion of air filtration assembly 100 with gas turbine system 10 allows for early detection of undesirable particles 112 flowing to compressor 12, which in turn may prevent or reduce damage to compressor 12 by allowing for immediate indication for repair, maintenance, and/or replacement of components of air filtration assembly 100.

In an embodiment, the control system 130 integrates an intelligent model 160 of fluid flow within the air filtration assembly 100 based on data measured by the electrostatic sensor(s) 132. In an embodiment, the data measured by the electrostatic sensor(s) 132 includes, but is not limited to, the volume, distribution, and type of particulate entering the compressor 12. The intelligent model 160 incorporates known data from a database in the form of the structure of the gas turbine system, the structure of the various fluid flow paths, the location(s) of the electrostatic sensor(s) 132, other known fluid flow data, testing data, and/or field observations to create a customized, specifically-tailored analysis of the fluid flowing through a specific air filtration assembly 100 in real time. The intelligent model 160 employs equations and/or algorithms to model particle deposition rates, particle fouling rates, and/or compressor degradation rates, etc.

In an embodiment, the control system 130, using the intelligent model 160, is configured to pinpoint probable leak (i.e., particular or debris ingress) locations or areas on the filter inlet housing 102. For example, the intelligent model 160 may utilize ambient condition data, particle ingress data/measurements from electrostatic sensors 132, system configuration/layout data, and other known fluid flow data, testing data, field observations, and/or computational fluid dynamic modeling to determine where on the inlet filter housing 102 particulate is likely entering, in real time. In an embodiment, the ambient condition data may include, for example, wind speed, wind direction, weather, ambient air particulate concentration, and/or ambient air particulate size. The particle ingress data/measurements may be carried out using a suite of electrostatic sensors positioned at various locations between the inlet 106 and compressor 12, and may include, for example, particulate size, particulate concentration, particulate type, location of particulates at various locations along fluid flow path, and/or location of particulates at compressor inlet). In an embodiment, the location along the air flow pathway may be a circumferential location and/or a radial location within the flow pathway. In an embodiment, the location along the air flow pathway may be a circumferential location and/or a radial location at an inlet of the compressor.

Figure 6:
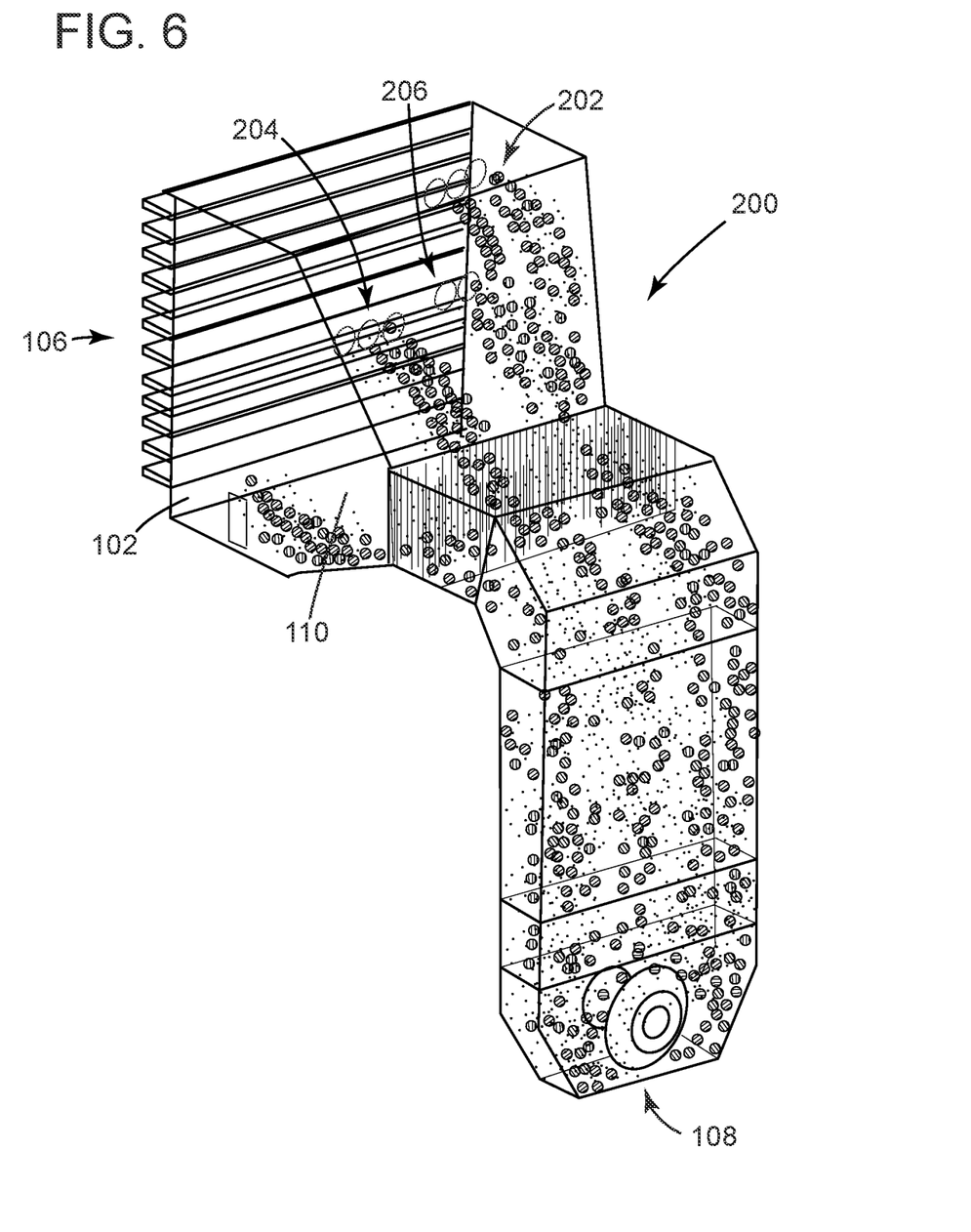
FIG. 6 is a computer generated model of particulate flow from a weather hood to a compressor inlet of a gas turbine system.

FIG. 6 illustrates an exemplary model 200 generated by the intelligent model 160 and utilized by the control system 130 to determine probable particulate ingress locations 202, 204, 206 in the inlet filter housing 102. In an embodiment, the control system 130, using intelligent model, is configured to determine probable particulate ingress locations down to individual weather hood/inlet passages. The intelligent model 160 is intended to be only an exemplary manner of determining the probably particulate ingress locations in the inlet duct; it will be appreciated that other systems, devices and methods may also be utilized for determining actual or probable particulate ingress locations without departing from the broader aspects of the invention.

Figure 7:
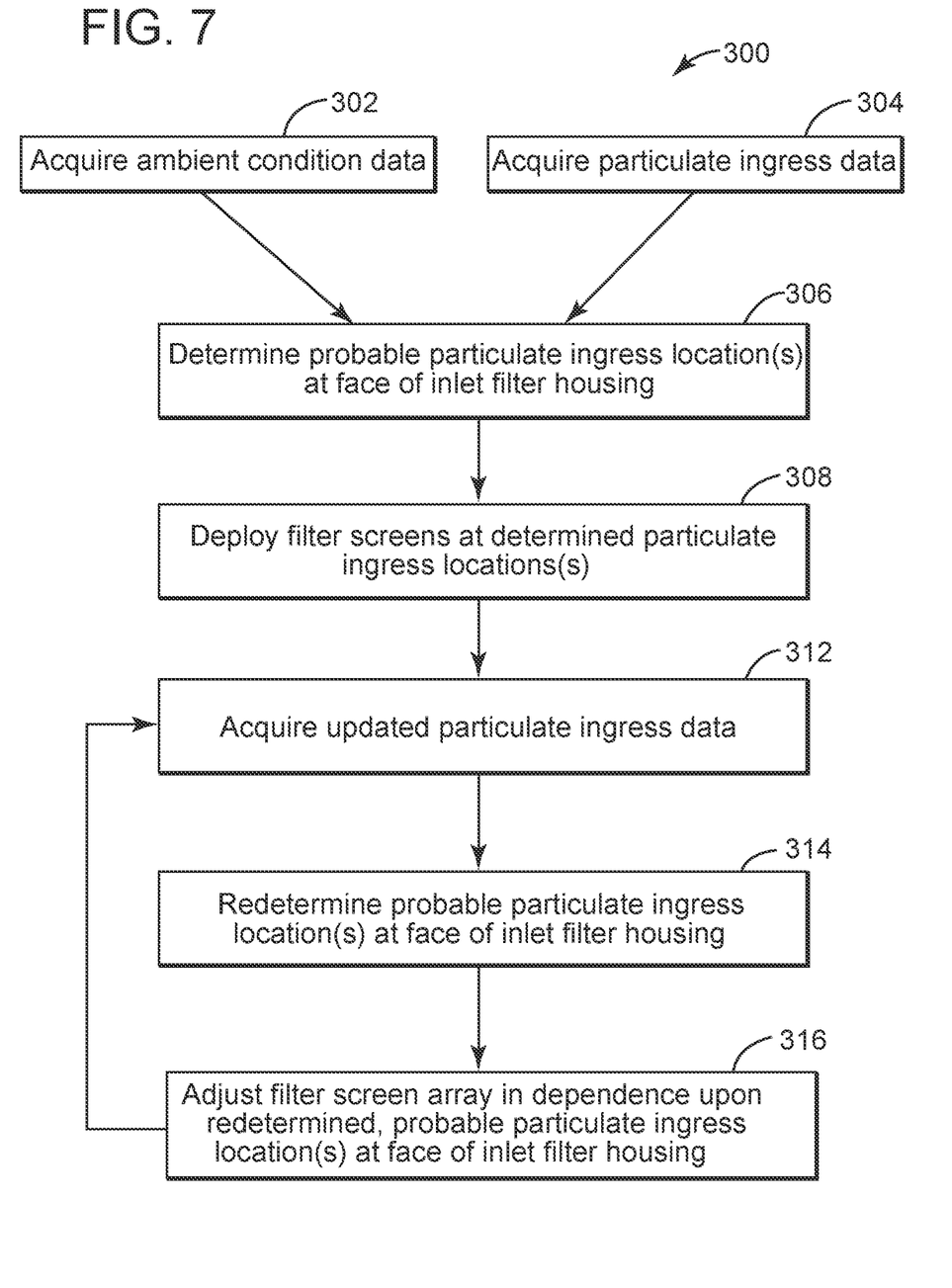
FIG. 7 is a flow diagram illustrating a method for inhibiting particulate and foreign object ingress in a gas turbine system, used by the gas turbine and air filtration assembly/system of FIG. 1, according to an embodiment of the invention.

Turning now to FIG. 7, a method 300 for inhibiting particulate and foreign object ingress using the system of the invention is illustrated. Initially, the control system 130 (and/or the intelligent model 160) acquires ambient condition data and particulate ingress data, at steps 302 and 304, respectively using techniques that are subject of separate applications but which have been described briefly above. As indicated above, ambient condition data may include, for example, wind speed, wind direction, weather, ambient air particulate concentration, and/or ambient air particulate size. The particle ingress data may be acquired using the suite of electrostatic sensors positioned at various locations between the inlet 106 and compressor 12, and may include, for example, particulate size, average particulate size, particulate concentration, average particulate concentration, particulate volume, particulate type, particulate velocity, location of particulates at various locations along fluid flow path, and/or location of particulates at the compressor inlet (i.e., dispersion pattern of the charged particles 113). In an embodiment, the location along the air flow pathway may be a circumferential location and/or a radial location within the flow pathway. In an embodiment, the location along the air flow pathway may be a circumferential location and/or a radial location at an inlet of the compressor.

Using this data, along with testing data and the like, as described above, the control system 130/intelligent model 160 determines probable particulate ingress locations at the face of the inlet filter housing 102, at step 306. After determining the particular areas on the inlet filter housing 102 where particulate is entering, the control system 130 actuates the appropriate relays 152 to move the filter screens associated with the particulate ingress locations to the deployed position, at step 308. In this position, the inlet air 104 flows through the filter screens 150, which inhibits or prevents the particulate from entering the inlet filter housing 102.

With further reference to FIG. 7, in an embodiment, once the selected filter screens 150 are deployed at the probable particulate ingress locations, the control system 130 acquires updated particulate ingress data, at 312, after a predetermined period of time. This updated particulate ingress data may be acquired utilizing electrostatic sensors in the manner described above. This data can then be compared to the data acquired at step 304 to determine if deployment of the filter screens 150 at the selected locations was successful at inhibiting the ingress of particulate. If further corrective action is needed, the control system 130, using intelligent model 160 in the manner described above, redetermines the probable particulate ingress location(s) at the face of the inlet filter housing 102, based on the updated particulate ingress data, at step 314. Finally, the array of filter screes 150 is then adjusted (deploying some and retracting others via relays 152) in dependence upon the redetermined, probable particulate ingress location(s) at the face of the filter housing 102, at step 316. In an embodiment, steps 312, 314 and 316 may be continuously repeated during system operation. In another embodiment, steps 312, 314 and 316 may be repeated at predetermined intervals. In yet another embodiment, steps 312, 314 and 316 may be repeated only if particulate ingress data (e.g., particulate concentration, particulate size, particulate detection location, etc. exceeds a predetermined threshold stored in memory).

While the invention has been described herein as employing electrostatic sensors for detecting particulate and foreign object in the intake airflow, the invention is not intended to be so limited in this regard. In particular, it is contemplated that a variety of systems and methods may be utilized to detect the particulate or foreign objects (including particulate size, type, concentration, etc.) in the intake air flow including, for example, laser based optical sensing systems.

The system and method of the invention, as disclosed above, therefore provides for the selective deployment and retraction of filter screens 150 associated with the inlet filter housing 102 (and, particularly, with the respective weather hoods 119 and air passages thereof) in dependence upon probable particulate ingress locations as determined by the controller 130 using intelligent model 160. This is in contrast to existing filter systems for gas turbines where static filters are utilized. The invention described herein therefore allows for only the filter screens required to inhibit particulate ingress to be deployed (while the others are out of the path of airflow), which maximizes airflow to the compressor. By only deploying the filter screens in the areas of the inlet filter housing 102 necessary to keep out particulate, the entirety of the airflow into the inlet filter housing 102 is not obstructed by the filter screens, which minimizes the pressure drop across the face of the inlet filter housing 102 and/or within the filter housing and maximizes system (i.e., gas turbine) performance. This is simply not possible with existing filtration assemblies that use static filters that, due to their inability to be retracted, continuously obstruct airflow even if they are not needed to prevent the ingress of particulate matter at any given time.

In connection with the above, in an embodiment, the control system controller 130 is configured to adjust the position of the filter screens 150 within the array in dependence upon a pressure drop (or pressure) within the inlet filter housing 102, in dependence upon a performance or efficiency of the gas turbine 10, and/or in dependence upon a sensing system's output data and computational fluid dynamics (CFD) signatures/patterns. For example, the control system 130, in an embodiment, may balance the need to filter particulate matter at the likely ingress locations with the need to minimize a pressure drop within the inlet filter housing 102 so as to maximize engine performance. In particular, in an embodiment, the control system 130 may deploy a subset of the filter screens 150 by actuating relays 152 in order to inhibit or prevent the ingress of particulates. If, however, the pressure drop (or pressure) within the inlet filter housing exceeds or drops below a preset threshold, then the control system 130 will adjust the position of the filter screens 150 until the pressure or pressure drop comes back within acceptable limits (e.g., by retracting some of the filter screens 150).

Figure 8:
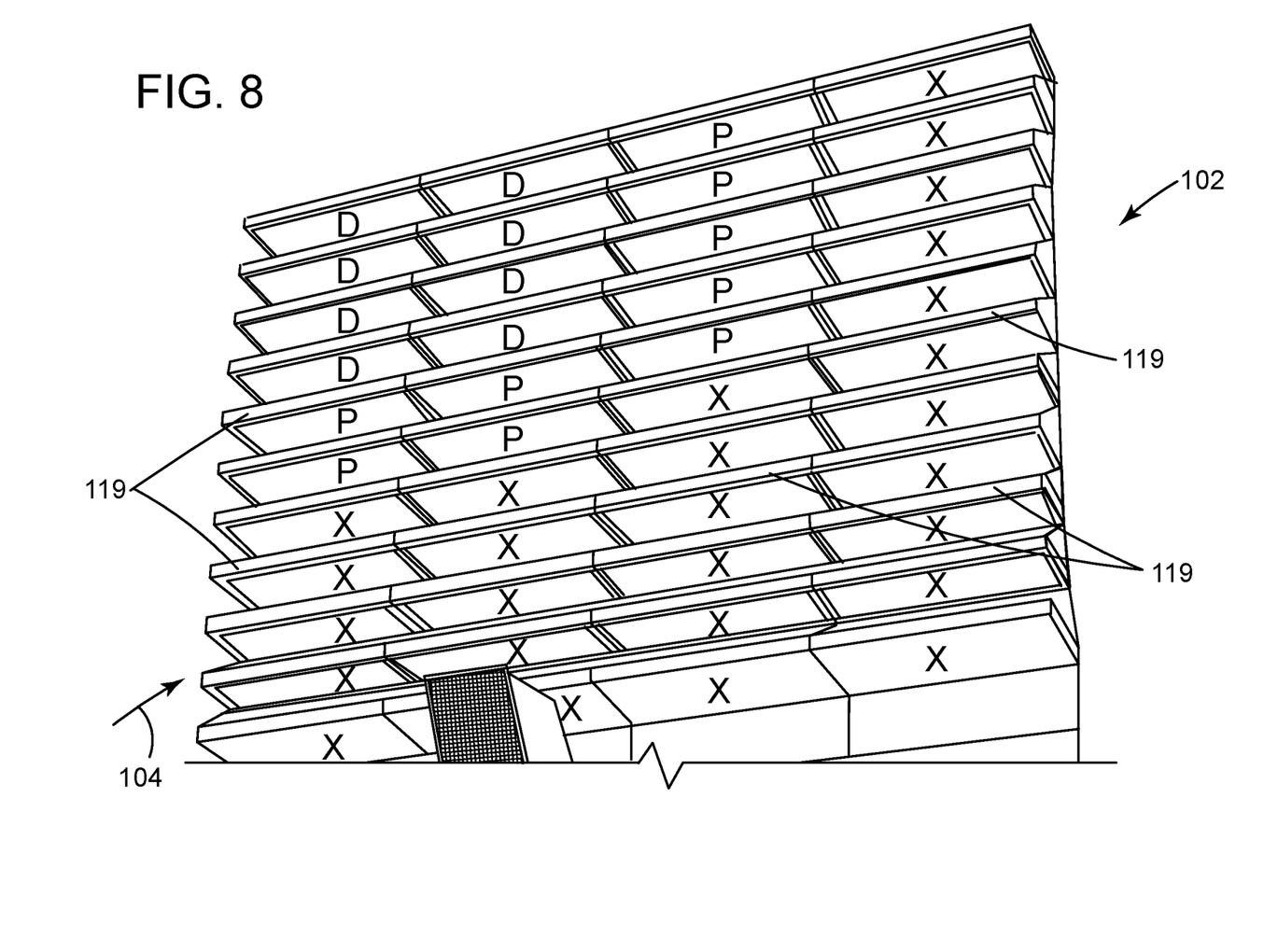
FIG. 8 is an enlarged, detail view of a front face of an inlet filter housing of the air filtration system of FIG. 1, illustrating various operational modes of filter screens.

While the filter screens 150 have been described above as being movable between a retracted position and an extended/deployed position via relays 152, and under control of the control system 130, the invention is not intended to be so limited in this regard. For example, in an embodiment, each filter screen 150 may be selectively positioned at a plurality of incremental positions intermediate the retracted position and the deployed position (e.g., a partially deployed position). This allows system performance to be maximized to an even greater degree, and allows for even more precise control of both filtration of particulates and airflow to the compressor. FIG. 8 depicts the front face of the inlet filter housing 102 with the array of weather hoods 119 and air passages formed thereby. As disclosed above, each weather hood 119 and air passage may have and associated or dedicated filter screen 150 (and actuator and relay 152), forming an array or matrix of filter screens 150 configured to remove particulates from the inlet airflow 104.

As indicated, in an embodiment, and depending upon the determination of probable area(s) of particulate ingress, the control system 130 is configured to position each of the filter screens 150 in either a deployed/extended position where it is placed entirely or substantially entirely across the air passage, a partially deployed position where it extends only partially into the air flow 104 (but some portion of the air flow is permitted to bypass the filter screen 150), or a retracted position where all of the air flow through the passage is permitted to bypass the filter screen. For example, as shown in FIG. 8, the control system 130, using intelligent model 160 may determine that the primary location of particulate ingress is occurring at the upper left quadrant on the front face of the inlet filter housing 102, with the highest concentration of particulate entering through the extreme upper left of the inlet filter housing 102, with a lesser concentration moving down and to the right. In response to this determination, the control system 130 may fully deploy the filter screens 150 in the upper left quadrant (denoted by the letter D), and partially deploy the filter screens 150 on the outer boundary of the high particulate concentration ingress area (denoted by the letter P), and maintain (or retract) the filter screens 150 in all other matrix locations (denoted by the letter X). As indicated above, deploying only the filter screens necessary to stop particulate ingress minimizes the pressure drop across the face of the inlet filter housing 102, maximizes airflow to the compressor 12, and therefore optimizes overall system performance heretofore not possible in the art.

Moreover, while the filter screens 150 have been disclosed herein as being positioned adjacent to the front face of the inlet filter housing 102 at inlet 106, the invention is not intended to be so limited in this regard. In particular, in an embodiment, the array of filter screens 150 may be positioned at any location along the air flow passage/inlet duct 102 between the inlet 106 and the outlet 108 or between the inlet 106 of the inlet filter housing 102 and the inlet of the compressor 12. In yet other embodiments, the system may include a plurality of layers or matrices of filter screens. For example, the system may include a first array or matrix of filter screens located at the inlet 106 and one or more arrays of filter screens downstream from the inlet 106. Such a configuration would allow for an even greater level of control over particulate ingress, pressure drop and overall system performance.

The system and method of the invention, as described herein, are particularly suitable for use in areas where extreme weather may generate a high concentration of particulate matter or foreign object debris in the intake airflow. Such areas may include arid or desert regions where sandstorms or high dust conditions are common, and/or in marine or coastal environments where there is a lot of moisture in the intake air. As disclosed above, when severe climatic conditions such as sandstorm, dusty or high-moisture conditions are detected, the control system actuates the electrical switch/relay/valve to deploy or close a series of mesh filter screens to avoid, or stop, a large influx of dust or particulate. When conditions normalize, the actuator is commanded to open or retract the filter screens to prevent or alleviate any additional pressure drop. The invention thus is capable reducing particulate and/or foreign object ingress related events in a gas turbine system, and therefore reduces the cost of maintaining gas turbine system components.

Finally, the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein, which may be in real-time. For example, the system 10 may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory (DRAM), which typically constitutes the main memory. Common forms of computer-readable media include, for example, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in a software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

Further aspects of the invention are provided by the subject matter of the following clauses:

A method for inhibiting particulate ingress in a combustion system, comprises the steps of acquiring particulate ingress data, determining a probable particulate ingress location on an air inlet of the combustion system in dependence upon the particulate ingress data, and deploying a filter screen at the determined probable particulate ingress location to inhibit particulate ingress at the determined probable particulate ingress location.

The method according to the preceding clause, wherein the particulate ingress data includes at least one of particulate size, particulate concentration, particulate type, and/or location of particulate along an air flow pathway.

The method according to the preceding clause, wherein the circumferential location of particulate in a cross section of the air flow pathway is a circumferential or radial location of particulate at an inlet of a compressor.

The method according to any one of the preceding clauses, wherein the method further includes acquiring ambient condition data, wherein the step of determining the probable particulate ingress location on the air inlet of the combustion system is carried out in dependence upon the ambient condition data in addition to the particulate ingress data.

The method according to the preceding clause, wherein the ambient condition data includes at least one of wind speed, wind direction, weather, ambient air particulate concentration, and/or ambient air particulate size.

The method according to any one of the preceding clauses, wherein the probable particulate ingress location is a plurality of probable particulate ingress locations, and wherein the step of deploying a filter screen at the determined probable particulate ingress location includes deploying a plurality of filter screens at the determined probable particulate ingress locations.

The method according to the preceding clause, wherein the step of deploying a plurality of filter screens at the determined probable particulate ingress locations includes fully deploying at least one of the filter screens and only partially deploying at least another of the filter screens.

The method according to any one of the preceding clauses, wherein the method further includes the step of, after deploying the filter screen at the determined probable particulate ingress location, acquiring updated particulate ingress data, and redetermining the probable particulate ingress location on the air inlet of the combustion system in dependence upon the updated particulate ingress data.

The method according to any one of the preceding clauses, wherein the method further includes at least one of retracting the filter screen and/or deploying an additional filter screen at the redetermined, probable particulate ingress location.

The method according to any one of the preceding clauses, wherein the filter screen is a mesh filter screen having an anti-rebounding coating.

A turbine system, comprising a turbine having a compressor for compressing intake air, and an inlet filter housing in fluid communication with the compressor and having an array of air passages for ingress of the intake air, the inlet filter housing being configured to remove particulates from the intake air prior to passage of the intake air to the compressor. The inlet filter housing includes an array of air passages for receiving the intake air therethrough, and an array of filter screens generally corresponding to the array of air passages. The array of filter screens are individually movable between a retracted position where the intake air is permitted to bypass a respective filter screen, and a deployed position where the intake air passes through the filter screen. When in the deployed position the filter screens are configured to remove the particulates from the intake air.

The turbine system the preceding clause, wherein the array of filter screens are individually positionable at a plurality of incremental positions intermediate the retracted position and the deployed position.

The turbine system of any one of the preceding clauses, wherein the system further includes a controller configured to determine a probable location of particulate ingress at the filter housing in dependence upon at least one of particulate ingress data acquired by sensors of the turbine system and/or ambient condition data of the ambient air outside the inlet filter housing, and to control a position of at least one filter screen in the array of filter screens.

The turbine system of any one of the preceding clauses, wherein the particulate ingress data includes at least one of particulate size, particulate concentration, particulate type, and/or location of particulate along an air flow pathway, and wherein the ambient condition data includes at least one of wind speed, wind direction, weather, ambient air particulate concentration, and/or ambient air particulate size.

The turbine system of any one of the preceding clauses, wherein the filter screens are mesh filter screens having an anti-rebounding coating.

The turbine system of any one of the preceding clauses, wherein the controller is further configured to acquire updated particulate ingress data, and redetermine the probable particulate ingress location on the air inlet of the combustion system in dependence upon the updated particulate ingress data.

The turbine system of any one of the preceding clauses, wherein the controller is further configured to adjust a position of at least one filter screen of the array of filter screens in dependence upon the redetermined probable particulate ingress location.

A method for inhibiting particulate ingress in a combustion system comprises the steps of providing an inlet duct in fluid communication with a turbine having a compressor, the inlet duct having an intake area for a flow of intake air, determining at least one location of particulate or foreign object ingress along the intake area, and moving a first subset of filter screens of an array of filter screens so as to extend across the flow of intake air at the location of particulate or foreign object ingress.

The method according to the preceding clause, wherein the step of determining the at least one location of particulate or foreign object ingress includes sensing or measuring at least a concentration and/or distribution of particulates or foreign objects at an inlet of the compressor.

The method according to any one of the preceding clauses, wherein the method further includes the step of adjusting a position of a plurality of filter screens in the array of filter screens in dependence upon a pressure within the inlet duct and/or turbine performance.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for inhibiting particulate ingress in a combustion system, comprising the steps of:
   acquiring particulate ingress data in an air flow pathway of the combustion system, the particulate ingress data representative of particles in the air flow pathway charged by an electrostatic component including a matrix of ionizers and particles in the air flow pathway uncharged by the electrostatic component;
   determining a probable particulate ingress location on an air inlet of the combustion system in dependence upon the charged particles and the uncharged particles in the particulate ingress data; and
   deploying a filter screen at the determined probable particulate ingress location to inhibit particulate ingress at the determined probable particulate ingress location.

2. The method according to claim 1, wherein:
   the particulate ingress data includes at least one of particulate size, particulate concentration, particulate type, and/or location of particulate in a first cross section of the air flow pathway.

3. The method according to claim 2, wherein;
   the location of particulate in the first cross section of the air flow pathway is a circumferential or radial location of particulate at an inlet of a compressor.

4. The method according to claim 1, further comprising the step of:
   acquiring ambient condition data;
   wherein the step of determining the probable particulate ingress location on the air inlet of the combustion system is carried out in dependence upon the ambient condition data in addition to the particulate ingress data.

5. The method according to claim 4, wherein:
   the ambient condition data includes at least one of wind speed, wind direction, weather, ambient air particulate concentration, and/or ambient air particulate size.

6. The method according to claim 1, wherein:
   the probable particulate ingress location is a plurality of probable particulate ingress locations; and wherein the step of deploying the filter screen at the determined probable particulate ingress location includes deploying a plurality of filter screens at the determined probable particulate ingress locations.

7. The method according to claim 6, wherein:
the step of deploying the plurality of filter screens at the determined probable particulate ingress locations includes fully deploying at least one of the filter screens and only partially deploying at least another of the filter screens.

8. The method according to claim 1, further comprising the steps of:
after deploying the filter screen at the determined probable particulate ingress location, acquiring updated particulate ingress data, and redetermining the probable particulate ingress location on the air inlet of the combustion system in dependence upon the updated particulate ingress data.

9. The method according to claim 8, further comprising the steps of:
at least one of retracting the filter screen and/or deploying an additional filter screen at the redetermined, probable particulate ingress location.

10. The method according to claim 1, wherein:
the filter screen is a mesh filter screen having an anti-rebounding coating.

11. A turbine system, comprising:
a turbine having a compressor for compressing intake air;
an inlet filter housing in fluid communication with the compressor and having an array of air passages for ingress of the intake air, the inlet filter housing being configured to remove particulates from the intake air prior to passage of the intake air to the compressor;
an electrostatic component including a matrix of ionizers in the inlet filter housing to charge particles in the intake air flowing through the inlet filter housing; and
a control system configured to determine a probable location of particulate ingress at the inlet filter housing as a function of particulate ingress data obtained from the inlet filter housing, the particulate ingress data representative of particles in the intake air in the inlet filter housing charged by the electrostatic component and particles in the intake air uncharged by the electrostatic component;
wherein the inlet filter housing includes the array of air passages for receiving the intake air therethrough, and an array of filter screens generally corresponding to the array of air passages;
wherein the array of filter screens are individually movable between a retracted position where the intake air is permitted to bypass a respective filter screen, and a deployed position where the intake air passes through the filter screen;
wherein when in the deployed position the filter screens are configured to remove the particulates from the intake air; and
wherein the control system is configured to deploy a filter screen at the determined probable particulate ingress location to inhibit particulate ingress at the determined probable particulate ingress location.

12. The turbine system of claim 11, wherein;
the array of filter screens are individually positionable at a plurality of incremental positions intermediate the retracted position and the deployed position.

13. The turbine system of claim 11, wherein:
the control system is further configured to determine the probable location of particulate ingress at the inlet filter housing in dependence upon ambient condition data of the ambient air outside the inlet filter housing.

14. The turbine system of claim 13, wherein:
the particulate ingress data includes at least one of particulate size, particulate concentration, particulate type, and/or location of particulate along an air flow pathway; and
wherein the ambient condition data includes at least one of wind speed, wind direction, weather, ambient air particulate concentration, and/or ambient air particulate size.

15. The turbine system of claim 13, wherein
the control system is further configured to acquire updated particulate ingress data, and redetermine the probable particulate ingress location on the air inlet of the combustion system in dependence upon the updated particulate ingress data.

16. The turbine system of claim 15, wherein;
the control system is further configured to adjust a position of at least one filter screen of the array of filter screens in dependence upon the redetermined probable particulate ingress location.

17. The turbine system of claim 11, wherein:
the filter screens are mesh filter screens having an anti-rebounding coating.

18. A method for inhibiting particulate ingress in a combustion system, comprising the steps of:
providing an inlet duct in fluid communication with a turbine having a compressor, the inlet duct having an intake area for a flow of intake air;
determining at least one location of particulate or foreign object ingress along the intake area; and
moving a first subset of filter screens of an array of filter screens so as to extend across the flow of intake air at the location of particulate or foreign object ingress.

19. The method according to claim 18, wherein:
the step of determining the at least one location of particulate or foreign object ingress includes sensing or measuring at least a concentration and/or distribution of particulates or foreign objects at a cross section of an inlet of the compressor.

20. The method according to claim 18, further comprising the step of:
adjusting a position of a plurality of filter screens in the array of filter screens in dependence upon a pressure within the inlet duct and/or turbine performance.

* * * * *